Sept. 16, 1958     T. L. FAWICK     2,852,757
BRAKE ASSEMBLY INCLUDING A WARNING DEVICE
Filed Nov. 4, 1955
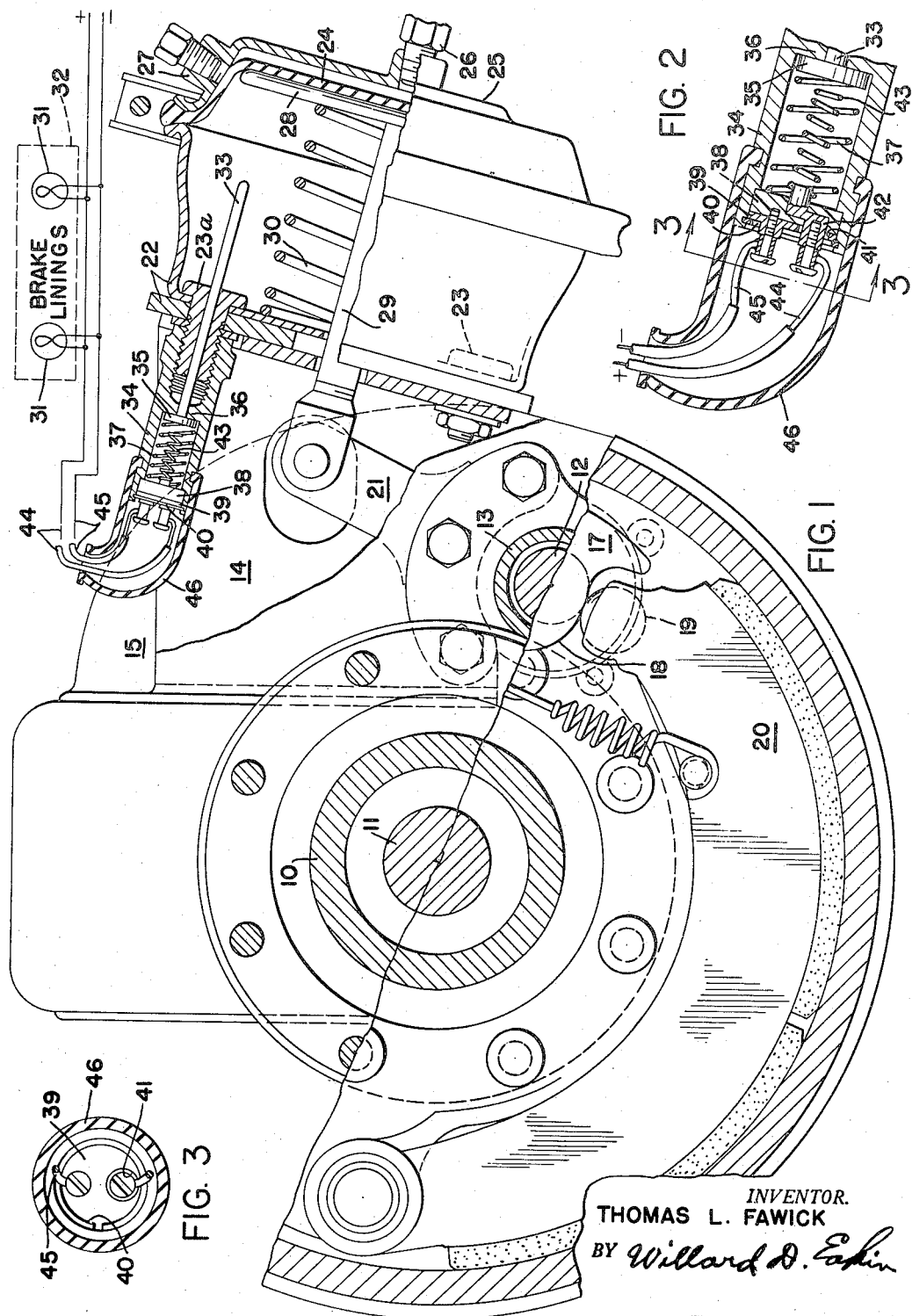
INVENTOR.
THOMAS L. FAWICK
BY Willard D. Eakin
ATTORNEY United States Patent Office 2,852,757
Patented Sept. 16, 1958

2,852,757

BRAKE ASSEMBLY INCLUDING A WARNING DEVICE

Thomas L. Fawick, Cleveland, Ohio, assignor to Fawick Corporation, Cleveland, Ohio, a corporation of Michigan Application November 4, 1955, Serial No. 544,948

4 Claims. (Cl. 340—52)

This invention relates to brake assemblies in which provision is made for warning the driver when it is important that his brakes be inspected, as in case the linings have become so worn that adjustment or relining of the brakes is required for safety. It is of especial value in the case of pneumatic or hydraulic power brakes in which the position at which the foot pedal or the hand lever is stopped is not an indication of the condition of the linings and also in the case of trailer brakes operated by remote control from the driver's cab on the tractor.

Its chief objects are to provide a simple and dependable warning system for the purposes indicated, and especially to provide such a system adapted to be simply and inexpensively incorporated in braking systems of a type that is now extensively used, and is shown for purposes of illustration in the accompanying drawings.

In this type of assembly the brake shoe is urged outward against the drum by a rotative cam having a rise which is followed by a cylindrical surface. In the absence of precaution against it the rise may continue to actuate the brake until the lining has worn out and the metal of the shoe has scored the brake drum, or until the cam follower is allowed to pass onto the cylindrical part of the cam. In the latter case the application of additional braking pressure is made impossible. Also, the cylindrical surface keeps the brake-shoe spring from assisting in the disengagement of the brake, and the return spring in the brake-applying and disengaging motor may not be able by itself to overcome friction for disengaging the brake.

Of the accompanying drawings:

Fig. 1 is a side elevation, with parts broken away and with parts sectioned in several different planes, of an assembly embodying my invention in its preferred form as applied to the type of brake assembly above referred to.

Fig. 2 is a section corresponding to a part of Fig. 1 but on a larger scale and with more detail.

Fig. 3 is a section on line 3—3 of Fig. 2.

The rear-axle and brake assembly comprises the usual axle-housing 10 and axle 11 therein and, spaced rearwardly from them, the usual brake-actuating rock-shaft 12 extending through a bearing sleeve 13 which is a part of the torque plate of the brake, the rock shaft being journaled in the said sleeve 13 and in a bracket 14 projecting rearwardly from the differential-housing 15.

Within the brake-housing, the shaft 12 has secured upon it the usual cam 17, of which the brake-applying rise is at 18, the cam acting against a ball 19 mounted in a socket in the swinging end of the brake-shoe 20.

At its other end the rock-shaft 12 has secured to it a brake-actuating arm 21.

The brake-actuating motor comprises a diaphragm chamber of which a housing member 22 is secured at its base to the bracket 14 by bolts such as the bolt 23, one of which, 23ª, is modified to serve as a supporting part of my signalling attachment.

Associated with diaphragm housing 22 are the usual diaphragm 24; cover plate 25 having alternative fluid-connection nipples 26, 27 for charging and venting the diaphragm chamber; push-plate 28, which has its push-rod or stem 29 hinged to the rocker-arm 21; and the return spring 30.

The signalling attachment is adapted to close an electric circuit to illuminate preferably two electric bulbs 31, 31 mounted in parallel, so that at least one of them can be depended upon to give the signal. Preferably the bulbs are mounted on the instrument board, back of a glass panel 32 marked with suitable indicia such as "Brake linings" or "Inspect brakes."

The attachment comprises an electric-contact, "feeler," push-bar 33 projecting into the diaphragm housing through a guideway and adapted to be contacted at its inner end and actuated by the diaphragm's push-plate 28 whenever the brake linings have become so worn, or such other situation has arisen, as to permit the push plate to move far enough in its brake-applying movement to perform that function.

The guideway for the push-bar 33 preferably is provided by drilling a hole lengthwise through one of the standard clamping bolts, 23ª, and screwing onto its outer end, instead of the usual clamping nut, a guideway and casing member 34, which serves also as a clamping nut.

At its end farthest from the diaphragm the contact push-bar 33 is formed with a stop head 35 normally held against a partition 36 in the casing, through which partition the stem portion of the push-bar extends and with which, as well as with the bolt 23ª, it constantly has slidable electric contact.

For normally holding the push bar 33 with its head against the partition, a compression spring 37 is mounted between the said head and a thick disc of insulating material 38 seated against a shoulder in the casing, having an outer metal face plate 39, and held in place by a snapping 40 which has constant electric contact with said face plate and with the wall of the casing 34.

The face plate 39 is formed with a clearance hole 41 through which projects, without contact with the plate, an electric-connection part of a metal member 42 which is embedded in and extends through the insulator disc 38 and at the inner face of the disc has a projecting spring-post part upon which is mounted, and secured as by welding, an electric-contact spring 43. This spring freely projects to a position which is at a suitable distance from the normal position of the electric-contact stop-head 35 of the electric contact push-bar 33.

Connected to the projecting outer end of the member 42 is an electric conductor 44, extending from a battery, not shown, and through the light bulbs 31, 31, for maintaining a positive charge in the bulbs.

The push bar 33, as above indicated, is constantly grounded on the vehicle frame, but for assuring completeness of the return circuit, in spite of greasy connection of a trailer with its tractor, for example, and for facility of incorporating the device in a braking system already installed, a negative conductor 45 is connected to the face plate 39 of the disc insulator 38 and is adapted to be connected to the frame of the vehicle or to the negative post of the battery.

A protective rubber hood 46 is mounted as shown upon the casing 34 and surrounds the adjacent parts and attachments of the conductors 44, 45.

The electric-contact push-bar 33 and the contact spring preferably are made of, or covered with, a noncorroding metal so that on occasion they will make good electric contact even though they may have been in place for a long time before conditions are such as to effect actuation of the device.

The contact bar 33 being of proper length and the contact spring 43 having the proper spacing from the normal position of the contact head 35, application of the brakes causes the push-plate 28 to move the head 35 into contact with the spring 43, and thus closes the circuit and causes the bulbs to light, only when the brake-lining has become so worn that local adjustment or relining of the brakes is needed, or a loose connection has developed. Such warning as to one brake of a set should of course be sufficient to result in a complete check of all of them.

Because of yielding of the contact spring 43, full application of the brakes is permitted, with the bulbs continuing to be lighted while the braking operation is being completed.

The construction as described is such that the vulnerable parts of the device are well protected by the diaphragm housing, the modified clamping bolt 23ª, the casing 34 and the rubber hood 46.

Modifications are possible without departure from the scope of the invention as defined in the appended claims.

I claim:

1. A brake assembly comprising a brake having a wearing frictional part, a fluid motor outside of the brake for actuating said brake, said motor comprising means defining a variable-volume chamber and mounted therein, a fluid-impelled structure which is moved throughout a range of movement that is extended as said frictional part wears away, a feeler having a contact element within said chamber acted upon by said fluid-impelled structure only when said range has been extended a determinate amount, and a signal actuated by said feeler, the said feeler being pushed by said structure and maintaining the signal from the beginning of and throughout the part of said range through which it is so extended.

2. A brake assembly comprising a brake having a wearing frictional part, a fluid motor outside of the brake for actuating said brake, said motor comprising means defining a variable-volume chamber and, mounted therein, a fluid-impelled structure which is moved throughout a range of movement that is extended as said frictional part wears away, a feeler having a contact element within said chamber and acted upon by said fluid-impelled structure only when said range has been extended a determinate amount, and a signal actuated by said feeler, the said assembly comprising a yielding electric contact member and a mechanical member moved by the fluid motor to effect electrical contact of said contact member and then further so moved to the end of the brake-applying stroke of the motor while continuing to maintain the said electrical contact.

3. An assembly as defined in claim 2 in which the yielding contact member comprises a spring which continues to be further deformed by further movement of the said mechanical member after it has effected, and while still maintaining, the electrical contact.

4. An assembly as defined in claim 1 in which the motor comprises a clamping bolt extending through a wall of the defined chamber and formed with a through hole, a casing screwed upon said bolt as a clamping nut, and the defined feeler having parts housed in said casing and including a part extending, through the hole in the bolt, to the interior of the chamber, and said parts housed in the screwed-on casing being inclusive of a pair of make-and-break electric contacts.

References Cited in the file of this patent

UNITED STATES PATENTS

| | | |
|---|---|---|
| 2,031,741 | Smith | Feb. 25, 1936 |
| 2,183,700 | Sinclair | Dec. 19, 1939 |
| 2,554,064 | Shields | May 22, 1951 |

FOREIGN PATENTS

| | | |
|---|---|---|
| 118,360 | Great Britain | Aug. 29, 1918 |